United States Patent
Mier-Langner et al.

(10) Patent No.: US 7,027,736 B1
(45) Date of Patent: *Apr. 11, 2006

(54) ADDRESSABLE SYSTEM FOR LIGHT FIXTURE MODULES

(75) Inventors: Alejandro Mier-Langner, Providence, RI (US); James E. Kuchar, Fall River, MA (US)

(73) Assignee: Genlyte Thomas Group, LLC, Louisville, KY (US)

( * ) Notice: Subject to any disclaimer, the term of this patent is extended or adjusted under 35 U.S.C. 154(b) by 556 days.

This patent is subject to a terminal disclaimer.

(21) Appl. No.: 10/024,095

(22) Filed: Dec. 18, 2001

Related U.S. Application Data (60) Provisional application No. 60/335,357, filed on Nov. 2, 2001.

(51) Int. Cl.
*H04B 10/00* (2006.01)
*B60Q 1/124* (2006.01)
*G08C 19/00* (2006.01)

(52) U.S. Cl. ............... 398/106; 398/107; 398/108; 398/109; 398/111; 398/112; 398/118; 362/233; 362/251; 362/276; 362/295; 362/802; 340/825.72; 348/734

(58) Field of Classification Search ............ 398/106, 398/107, 108, 109, 111, 112, 118; 362/251, 362/233, 276, 295, 802; 340/825.69, 825.72, 340/545.3; 348/734
See application file for complete search history.

(56) References Cited

U.S. PATENT DOCUMENTS

| | | | |
|---|---|---|---|
| 4,200,862 A | 4/1980 | Campbell | |
| 4,375,106 A | 2/1983 | Voll | |
| 4,392,187 A | 7/1983 | Bornhorst | |
| 4,598,345 A * | 7/1986 | Kleeman | 362/233 |
| 4,684,822 A | 8/1987 | Angott | |
| 4,712,167 A * | 12/1987 | Gordin et al. | 362/233 |
| 4,722,030 A | 1/1988 | Bowden | |
| 4,779,168 A | 10/1988 | Montgomery | |
| 4,797,795 A | 1/1989 | Callahan | |
| 4,947,302 A | 8/1990 | Callahan | |
| 5,031,082 A | 7/1991 | Bierend | |
| 5,038,261 A | 8/1991 | Kloos | |
| 5,055,746 A | 10/1991 | Hu et al. | |
| 5,072,216 A * | 12/1991 | Grange | 340/825.52 |
| 5,176,442 A | 1/1993 | Richardson | |
| 5,192,126 A | 3/1993 | Remeyer et al. | |
| 5,209,560 A | 5/1993 | Taylor et al. | |

(Continued)

FOREIGN PATENT DOCUMENTS

DE 2700503 A1 7/1978

(Continued)

*Primary Examiner*—Jason Chan
*Assistant Examiner*—Quan-Zhen Wang
(74) *Attorney, Agent, or Firm*—John F. Salazar (57) ABSTRACT

An addressable system for light fixtures is described wherein a plurality of light fixture modules is individually or collectively addressable for programming by remote control. The remote control may individually select each of the track control modules through visible and narrowly defined selected light followed by transmission of programming commands for programming of pre-defined scenes, functions or other user defined and desired effects. Each of the track fixture modules may be selected or de-selected through the use of laser light and a plurality of track control modules may be collectively programmed through the use of a track repeater module, all of the modules communicatively connected to each other and selectable by a visible narrow light source such that the user may readily activate or de-activate programming sequences.

22 Claims, 5 Drawing Sheets

U.S. PATENT DOCUMENTS

| | | |
|---|---|---|
| 5,329,431 A | 7/1994 | Taylor et al. |
| 5,347,431 A | 9/1994 | Blackwell et al. |
| 5,382,947 A | 1/1995 | Thaler et al. |
| 5,406,176 A | 4/1995 | Sugden |
| 5,502,627 A | 3/1996 | Hunt et al. |
| 5,506,715 A | 4/1996 | Zhu |
| 5,526,245 A | 6/1996 | Davis et al. |
| 5,554,979 A | 9/1996 | Kohar et al. |
| 5,637,964 A | 6/1997 | Hakkarainen et al. |
| 5,731,664 A * | 3/1998 | Posa .......................... 315/194 |
| 5,769,531 A | 6/1998 | Hunt et al. |
| 5,921,659 A | 7/1999 | Hunt et al. |
| 5,936,362 A | 8/1999 | Alt et al. |
| 5,988,838 A | 11/1999 | Rudenberg |
| 6,004,005 A | 12/1999 | Demshki, Jr. |
| 6,120,262 A | 9/2000 | McDonough et al. |
| 6,127,925 A | 10/2000 | Bonsignore et al. |
| 6,130,412 A | 10/2000 | Sizemore |
| 6,163,275 A | 12/2000 | Hartzell |
| 6,169,377 B1 * | 1/2001 | Bryde et al. ................. 315/294 |
| 6,174,073 B1 | 1/2001 | Regan et al. |
| 6,192,282 B1 | 2/2001 | Smith et al. |
| 6,567,032 B1 * | 5/2003 | Mullaly et al. ............. 341/176 |
| 6,655,817 B1 * | 12/2003 | Devlin et al. ................ 362/233 |
| 6,687,487 B1 * | 2/2004 | Mosebrook et al. ........ 455/11.1 |
| 2001/0040805 A1 * | 11/2001 | Lansing et al. ............. 362/276 |

FOREIGN PATENT DOCUMENTS

| | | |
|---|---|---|
| DE | 3719384 | 12/1988 |
| DE | 3719384 A1 * | 12/1988 |
| DE | 4009363 | 9/1991 |
| DE | 4120849 | 1/1993 |
| DE | G 93 10 534.7 | 12/1993 |
| DE | 4241071 | 6/1994 |
| DE | 4327173 | 2/1995 |
| EP | 0031874 | 7/1981 |
| EP | 031874 B1 | 9/1984 |
| EP | 0482680 A1 | 4/1992 |
| EP | 0525654 | 2/1993 |
| GB | 2155708 A | 9/1985 |
| GB | 2315852 A | 2/1998 |

* cited by examiner

ADDRESSABLE SYSTEM FOR LIGHT FIXTURE MODULES

CROSS-REFERENCE TO RELATED APPLICATIONS

This application claims the benefit of U.S. provisional application No. 60/335,357, which was filed on Nov. 2, 2001.

BACKGROUND OF THE INVENTION

1. Technical Field of the Invention

The present invention relates to an addressable system for light fixtures, which is individually addressable and programmable by a remote control unit and which allows lamp control modules to be visibly addressed and alternatively programmed individually or in a group.

2. Review of the Prior Art

Addressable light systems are known in the art. These prior art systems typically utilize a variety of addressing techniques, through the use of a power line controller, digital or other electronic communication. A particular problem with addressing the individual lamp fixture modules is the actual addressability of the modules or the mechanism for selectively addressing and programming each module or a plurality of modules. It has been difficult, however, to program individually, all of the fixtures within the prior art system as they have been typically addressed through wide scale communication over a power line controller or through other indirect addressing means. None of the prior art devices provide a sufficient mechanism for selecting, addressing and programming a plurality of fixture modules readily through the use of a hand remote control unit such that the lamp control modules may be individually programmed or programmed in a group after visual selection.

SUMMARY OF THE INVENTION

The addressable light system of the present invention seeks to solve the drawbacks of the prior art addressable systems in that the lamp or light fixture control modules of the present invention are individually selectable by visible light and independently programmable by the remote control unit.

It is therefore an object of the present invention to provide an addressable system for light fixtures modules in which pre-existing track light fixtures may be mounted in the addressable system and which each track, luminaire or lamp control module may be individually addressable by the remote control unit.

Another object of the present invention is to provide an addressable system for light fixtures which has individually addressable track control modules which are selectable by visible light from the remote control unit while also programmable using alternative methods.

It is a further object of the present invention to provide an addressable system for light fixtures wherein each individual track control module is programmable independently from the other track control modules in the system while also providing that all of the individual track control modules are controllable and programmable by a track repeater module.

An additional object of the present invention is to have a plurality of individual addressable track control modules, which are controllable independently from the other modules and controllable by a remote control unit.

An additional object of the present invention is to provide a plurality of track control modules on a single lighting track wherein each of the modules are selectable and programmable from a remote location by a remote control unit.

The present invention also provides for individual selection of a plurality of track control modules which are integrated within a system of track lighting wherein a plurality of tracks are utilized and wherein the plurality of control modules are controllable across the entire system, which may include a plurality of track control modules on a plurality of tracks in a track lighting system.

Another object of the present invention is to provide visually addressable individual track control modules by a remote control unit or a visually addressable track repeater module.

The addressable system for light fixtures of the present invention provides a system wherein a plurality of individually addressable track control modules in a track lighting system are individually controllable or are controllable by a track repeater module, wherein the track repeater module may communicate with each of the individual track control modules through electrical communication or a power line carrier technology and wherein each of the individual track control modules recognizes the power line carrier signals transmitted by the track repeater module.

The addressable system for lighting fixtures of the present invention allows the ability to individually address the light fixtures or a group of light fixtures so that they can perform a variety of tasks, including dimming, on/off switching, fading, time delay or aiming when the fixture is motorized. The system of the present invention allows for the capability of programming in order to respond to a remote signal to perform a task individually or by a group of fixtures depending on the desired selection or application. The system of the present invention also has the capability to be used with other control products in order to respond to remote signals. The system of the present invention allows for the use of track control modules which are individually addressable by a remote control unit and which may act as a carrier for a standard light fixture. The control modules may also be built into a light fixture module in order to command a task for the individual fixture. The control module may also be built into a light fixture module in order to command a task for the individual fixture. Finally, the system of the present invention may utilize a track repeater module in order to send commands for group programming or group special affects such as fading and cycling of lights.

These and other objects are met by the addressable system for light fixtures of the present invention.

All of the above outlined objectives are to be understood as exemplary only and many more objectives of the invention may be gleaned from the disclosure herein. Therefore, no limiting interpretation of the objectives notes are to be understood without further reading of the entire specification, claims and drawings included herewith.

DESCRIPTION OF THE FIGURES

A better understanding of the addressable system for light fixtures of the present invention may be had by reference to the attached drawings, wherein like numbers refer to like elements, and wherein.

DETAILED DESCRIPTION OF THE PREFERRED EMBODIMENT

Figures 1, 3:
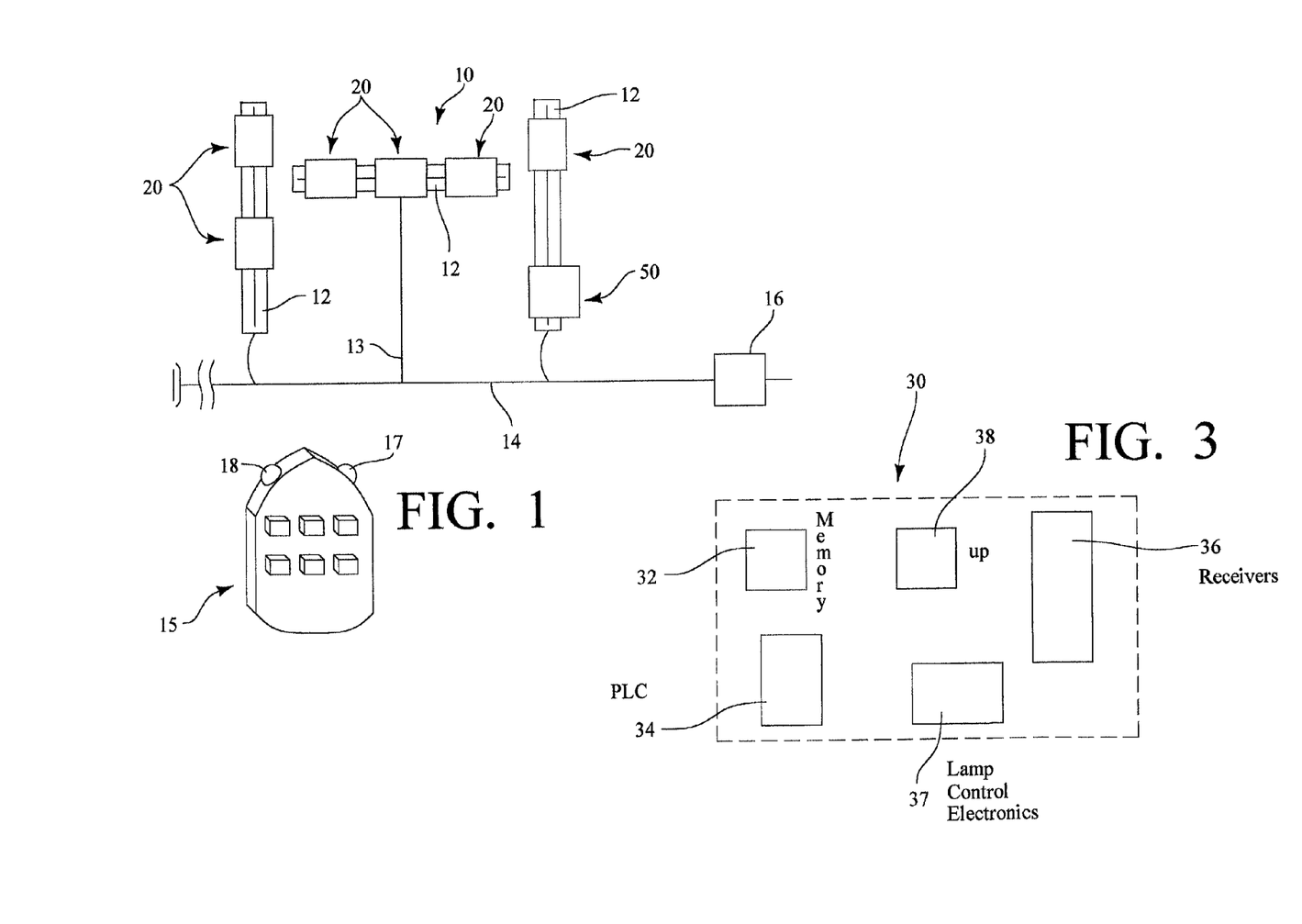
FIG. 1 is a schematic drawing of the addressable system for light fixtures of the present invention.
FIG. 3 is a schematic view of the control circuitry for the light fixture module depicted in FIG. 2.

The addressable systems for light fixture modules 10 of the present inventions are depicted schematically in FIG. 1. As exemplary shown therein, a plurality of tracks 12 in a track lighting system may be utilized to power and assemble a plurality of light fixture or track control modules 20. The tracks 12 may be a standard track lighting system wherein interchangeable light fixtures may be inserted and electrically connected. However, in the design of the present invention, track or lamp control modules 20 are individually selectable, programmable and controllable by the remote control unit 15 or may be controlled by the track repeater module 50. Each of the track control modules which make up the system 10 of the present invention may also be programmed to follow pre-programmed scenes or lighting selections or may have pre-programmed lighting selections which may be activated by the remote control unit 15 or by the track repeater module 50.

In general, the addressable system of the present invention 10 provides the ability for a user to individually select independent track control modules 20 for programming or for setting to user desired specifications. Each track control module 20 may be selected by the user using a visual selection device, such as a remote control unit 15 which has a laser transmitter 18 such that the user may readily direct the selection of an individual track control module 20. The track or lamp control module 20 has a laser or other photo-optic visible light receiver 25 or sensor which activates the light fixture module and allows the module to be programmed by the user through the remote control unit. Subsequent communication of commands between the user and the control module 20 through the remote control unit may be through standard infrared (IR) signal transmitter 17 which is received by the control module 20 through a infrared receiver 24. In order to aid the user in selection and provide a feedback as to a track control module 20 being selected for programming or adjusting, an LED 23 or other visually indicative electronics may be displayed on the control module 20.

Once selected by the laser transmitter 18, a control module 20 may be adjusted so that the output of the lamp 22 may be adjusted or dimmed, or the module 20 may be programmed by setting a desired lamp brightness level and having the module 20 store the setting in memory 32. Thus, a user, by utilizing the remote control unit 15, may program each individual control module 20 in the system 10 of the present invention by selecting individual modules and setting the lamp 22 to a desired setting. These settings may then be stored at each control module 20 by sending appropriate signals, IR command transmission or other communicative signal, to the module 20 for storing the setting in the modules memory for recall at later time. Once selected by the remote control unit by passing the laser over the light sensor 25, a command signal may then be transmitted to the module 20 to recall previously saved light settings. Also, as previously mentioned, in order to provide the user a visual indication that an individual module 20 is selected for programming or setting of lamp 22 thereon, an LED 23 or other visual programming indicating interface may be provided to blink or cause other visual indication of selection by the user and accessibility of the control module 20 for programming.

The visible light receiver 25 may be a laser detector such as a photo-diode with a half power angle of about 40 degrees for ease of user selection by the laser on the remote control unit. Further, the infrared receiver 24 may have a 90 degree detection angle at about 10 meters in order to ensure proper beam spread from the remote control unit. It may also be desirable to place a concentrating lens 71 over the laser receiver 25 and IR receiver 24 in order to make activation of the photo-diode more operable at longer distances. Such a concentrating lens will have little effect upon the IR receiver while making selection of the individual module 20 more readily available.

As can be understood, it is therefore desirable to provide a narrow visible selection mechanism, such as a laser transmitter 18, to provide the ability to selectively address individual modules 20 while also allowing a much wider band of communication, such as IR, to communicate with the modules. Thus, the system of the present invention seeks to combine the utilization of both visible selection for individual track control modules with a wider band communication mechanism for programming or other definition tasks.

Figure 2:
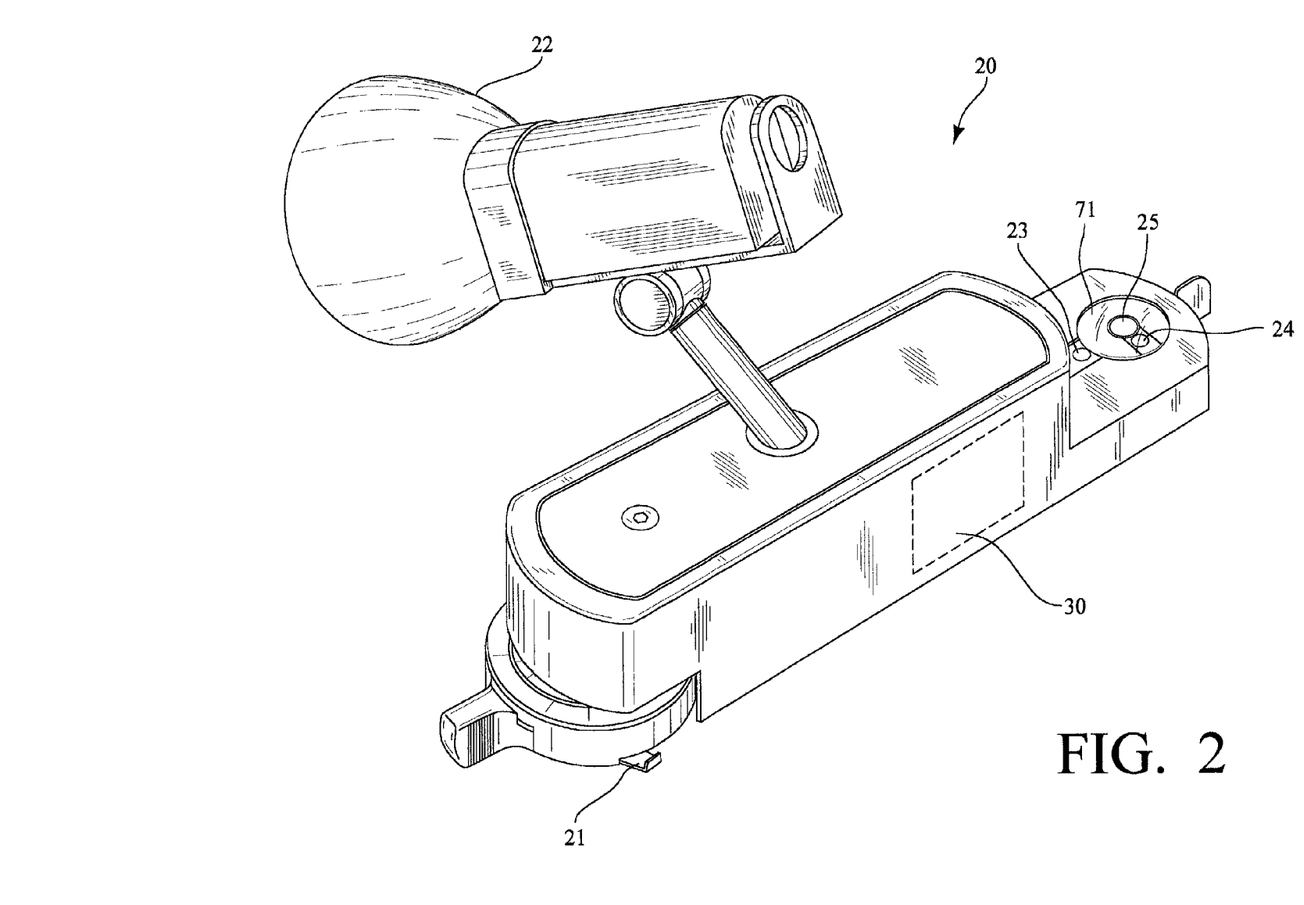
FIG. 2 is a front view of the light fixture module shown in FIG. 1.
Figure 4:
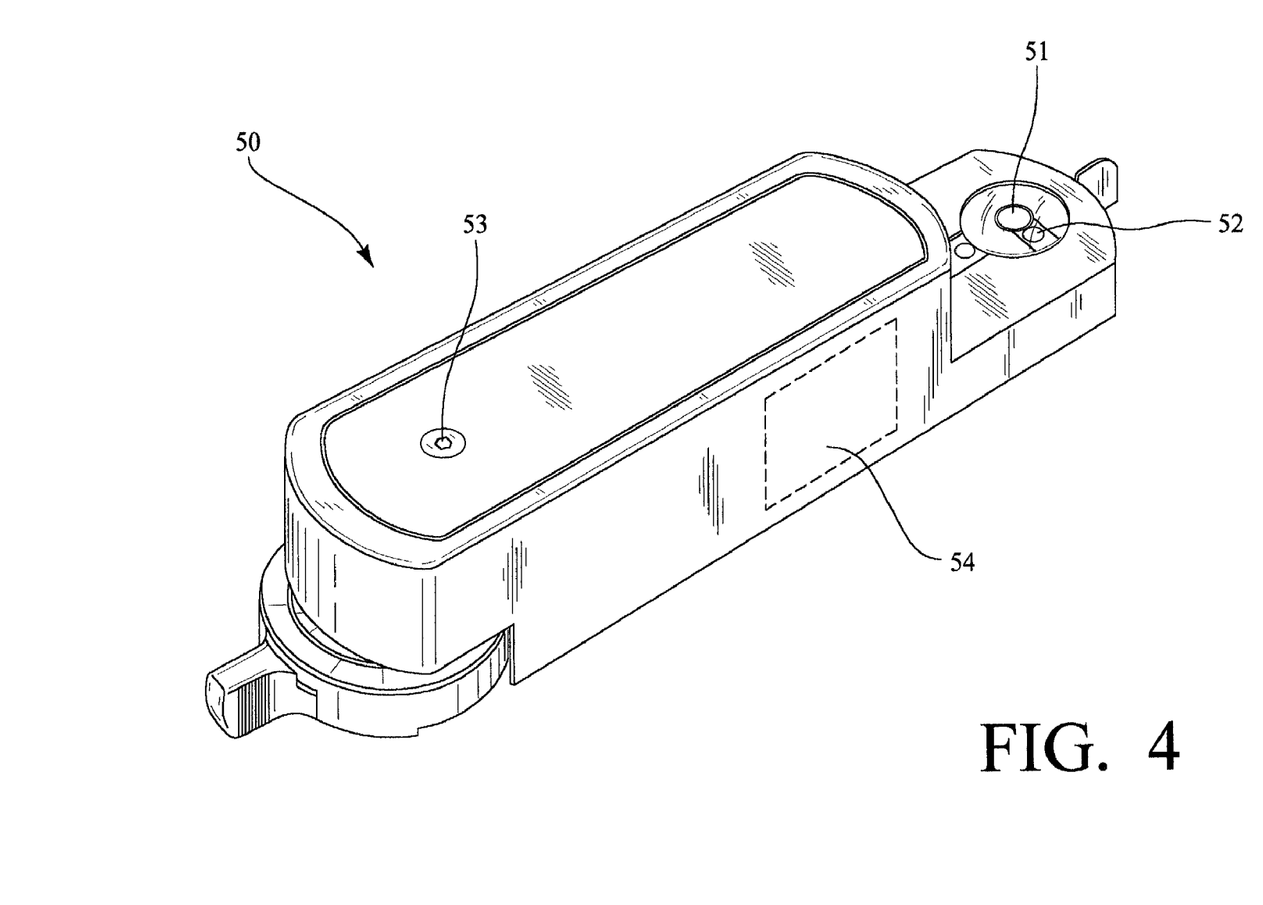
FIG. 4 is a front view of the master control module depicted in FIG. 1.

Track control module 20, as depicted in FIG. 2, may be comprised of a lamp 22 or other electronic device. The module may be electrically powered through track 12 by contact to electrical current maintained within track 12 through track runners 21. Thus, once installed within track 12, control module 20 will have ready access to power as long as current is supplied to the individual track 12 within system 10. Track control module 20 also has located therein an infrared sensor 24 and a laser or other user visually activatable sensor 25 in order that control circuitry 30 may be initiated into programming mode. Control circuitry 30, as shown generally in schematic in FIG. 3, comprises a number electronic components which may include memory 32, lamp control electronics 37, frequency receivers 36 which may include both infrared and visual light receivers or sensors previously described, a microprocessor 38 as well as power line controller communications circuitry 34. All of these components may work in conjunction with the system 10 of the present invention such that the module 20 may be selected, programmed or adjusted by the user through the use of visible selection and various other means of programming communication.

Memory 32 within the control circuitry 30 may include both ROM settings for lamp 22 and may also include non-volatile memory, or NVRAM, such that user desired scenes settings and cycle or fading functions may be stored and saved for subsequent recall. The ROM settings may be factory settings which are predefined for remote control unit 15 such as an OFF setting or automatic dimming setting wherein control circuitry 30 sets the light output of lamp 22 through lamp control circuitry 37. Lamp control circuitry 37 may consist of a number of known components for setting the output current to lamp 22 thereby adjusting the corresponding light output.

The control module 20 may also have on board in the control circuitry 30 a number of instructions in memory 32, said instructions operable with the microprocessor 38 such that the control module 20 is programmable from either the remote control unit 15 or the repeater module 50. These instructions may also allow the control module 20 to be placed appropriately in programming mode so that a plurality of lamp brightness levels may be stored in memory 32 in various predefined storage positions. Thus, a user may select a number of control modules 20 individually for programming of the lamp brightness storage positions such that each of the storage positions for each of the plurality of control modules may be programmed concurrently through repeater module 50 or independently and individually after individual selection by the remote control through the use of the laser.

Each of the control modules 20 may also have a predefined address for communication with the repeater module 50. This predefined address may be initially stored in memory 32 and the control circuitry 30 and may be updated or modified by the user through the use of the remote control unit 15. This predefined address will allow a user to define a group of lamp control modules 20, which are communicable with a repeater module 50 having the same address. Thus, commands repeated by the repeater module 50, which are dictated by the user through the use of the remote control 15, will be transmitted throughout the system of the present invention and received by the individual control modules 20 as long as the control modules have the same address as the repeater module 50. The control circuitry 30 therefore allows the ability for programming of the control modules 20 individually or as a group through the use of the repeater module 50, which will transmit commands as carrier line signals receivable by the control circuitry 30 and interpreted therein by the microprocessor.

Thus, track control module 20 may have a plurality of defined lamp settings all activatable by either use of the remote control unit 15 or through a carrier line signal sent through the power line through the use of a track repeater module 50. The control module 20 may be designed such that upon activation by application of power, a predefined signal may be sent to the track control module to set lamp 22 to a level stored in, for example, memory storage position A. This predefined signal may be through a carrier line signal in the power line initiated by the track repeater module 50 or may be activated by individual selection of the track control module 20 through use of the remote control unit 15.

As shown in FIG. 1, the system of the present invention allows, for example, standard track lighting power tracks 12 to be utilized for powering the individual track control modules 20. A plurality of modules 20 may be utilized in the addressable system for light fixtures of the present invention. The plurality of modules 20 in the system may be activated by either a track repeater module 50 using a carrier signal through the power line or through individual addressing by activation through the use of the remote control unit 15. Additionally, as indicated, the carrier line signal for control of the track control modules through the entire system 10 may be generated by the track repeater module 50 which is similarly installed into the tracks 12 of the track lighting system. Track repeater module 50 may be similarly selectable by the remote control unit through laser or other visual activation signal. Once selected, the track repeater module can be directed to send appropriate signals to all light fixture modules 20 to set the lamps 22 to a desired setting, such as, all lamps within the system are to be powered to the brightness level stored in memory position A or to a user defined brightness level. The user may select the track repeater module 50 by passing a laser or other visual selection signal over the sensor 51 and then send an appropriate command signals to be received by the IR receiver 52 in order to command the plurality of track control modules 20 in the system 10 to cycle through user defined or stored lamp settings.

The addressable system for light fixtures 10 of the present invention is comprised of multiple components as indicated above which include the track control module 20, remote control unit 15 and the track repeater module 50. Additionally, a power line controller 16 may be utilized for use in combination with the track repeater module so that a cross space filter is utilized for transmission of signals to multiple tracks electrically connected to the track repeater module 50.

In one implementation for the system of the present invention, a plurality of scenes may be programmed into each of the lamp control modules 20 individually or a plurality of control modules within the system 10 of the present invention may be selected by the remote control unit for programming through the use of repeater 50. Thus, the addressable system for light fixtures 10 of the present invention provides a means for selecting individual track control modules for programming a group of control modules. For selection of individual track control modules 20 of the present invention through the use of the remote control 15, the remote control is directed towards the selected lamp control module 20 wherein the laser 18 will activate the visible light sensor 25 of the track control module 20. The control circuitry 30 for the track control module, upon activation of a laser signal upon the sensor 25, places the track control module into programming mode. At such time as the track control module 20 is placed into programming mode, the LED 23 will flash indicating that the track control module is ready for receiving an IR command from the remote control.

Initially, the track control module 20 of the present invention, once placed in programming mode, will eventually receive a command indicating which memory location or "scene" the program is to be stored. Multiple lamp brightness levels or scenes can be programmed for each control module. All control modules will store individual "scenes" in pre-defined storage locations which may be, for example, scenes A, B, C, D and E. Each of these memory locations can store a specific lamp level setting for that particular scene for changing the light intensity. Only the light intensity of the particular track control module selected for programming will be adjusted once it is selected in program mode.

Once the remote control unit selects the scene or lamp brightness memory location, the infrared or IR command may be transmitted indicating either a raising or lowering or on/off for the desired light level for the particular scene being programmed. The remote control 15 may only need to be pointed in the general direction of the control module 20 to be programmed. Once the desired level is set for that particular scene, the remote control 15 may transmit a "program" or "learn" command in order for the particular light settings to be programmed in that particular memory location or scene. At such time, the LED 23 will discontinue blinking indicating that the scene or light level has been programmed. All lamp brightness memory locations for the control circuitry 30 in each individual track control module 20 may be programmed in a like manner.

A plurality of lamp control modules 20 may be concurrently programmed for lamp brightness levels in their specific memory locations for each of the plurality of control modules through the use of the repeater module 50. Thus, the user may select the repeater module through the laser or other visible light selection device which will cause the repeater module to transmit a program command to be sent through the entire system and to be received by all control modules in electrical communication with the repeater module 50. Subsequent lamp adjustment commands directed towards the repeater module will then be transmitted through the repeater module and through the system of the present invention such that all lamps for each of the plurality of lamp control modules will be systematically adjusted concurrently. Thus, the system of the present invention 10 provides a means for concurrently adjusting the lamp brightness level for a plurality of lamp control modules and also provides the ability, once the program or save command is sent to the repeater module, to save the current lamp brightness setting across the entire system for all lamp control modules currently in electronic communication with the repeater module. Therefore, the user may set in for example, scene A memory location, for a plurality of lamp control modules, the same lamp brightness level throughout the entire system for recall at a later time.

The benefit of utilizing the addressable system for light fixtures of the present invention is that individual track control modules 20 may be independently and readily selected by utilization of the laser 18 on the remote control 15. The infrared transmitter 17 on the remote control may be broad enough to transmit a wide enough signal such that each of the plurality of track control modules being programmed may readily receive the commands.

A variety of tasks may also be transmitted to each of the track control modules through the use of the remote control and repeater module 50. These tasks or effects can include functions such as "fade" or "cycling". Utilization of a fade effect allows an operator for the addressable system for light fixtures of the present invention to select a predefined amount of time required for transition from one scene to another. Thus, a number of scenes which are programmed into each of the track control modules may be presented and the system of the present invention will fade from one scene to another across the entire system for each of the plurality of lamp control module. Alternatively, a "cycle" effect may be available for transitioning from one scene to another on each of the control modules wherein the user may define the actual scenes to be cycled for each of the control modules. For use of the effect commands on the system of the present invention, a track repeater module 50 is utilized for synchronizing all of the control modules 20 to which the commands are to be issued. The track repeater module 50 is placed in the track of the system of the present invention and additionally has an infrared receiver 52 and a laser receiver 51 with other control circuit logic 54 for which includes a microprocessor, memory instructions transmission of commands to the other track or lamp control modules 20. The track repeater module 50 mounts directly into the lighting fixture track 12 and will repeat signals transmitted by the remote control 15 to all control modules 20 which are located on the same track 12 or to other tracks when the tracks are electrically connected through known cross phase filtering systems. Thus, the track repeater module 50 will allow the system of the present invention to communicate across multiple tracks and will eliminate the need to direct the remote control unit 15 at each individual track control module in order to perform a particular function or effect.

As shown in the schematic FIG. 1, the track repeater module 50 may be inserted in line into the light fixture track so that it may communicate directly with the track control modules 20 placed on the track 12 or it may communicate to all track control modules that are electrically connected and in electrical communication to the track repeater module 50. As depicted in the schematic, power line control unit 16 may be utilized in order to filter the power source so that the track repeater module may repeat signals emitted by the remote control unit. All track control modules located on the individual track 12 are electrically connected to the track repeater module 50 and will receive the signals transmitted by the repeater such that they may execute the program effect commands representative of the transmitted command from the remote control.

Thus, for example, the "fade" effect noted above allows the user to select the track repeater module 50 through the use of the remote control 15 by selection of the track repeater module 50 using laser 18. Once the laser is directed towards the track repeater module laser sensor 51, all of the control modules 20 associated with the repeater module are placed into the program mode for programming as a group. The repeater module 50 may communicate with the plurality of control modules 20 through predefined addressing wherein each of the control modules 20 have an address which is programmable and which, in order to communicate with the repeater module 50, must be equal to the repeater module address. Thus, a user may select at least one control module 20 to be associated with a repeater module 50 so that the repeater module controls a predefined set of control modules. This may be done through the use of the remote control unit 15 wherein the remote control unit may select the individual control modules 20 and provide a command for setting of the address. This same address setting function may be done with the repeater module. As can be understood, the system of the present invention may thus incorporate a plurality of repeater modules 50 each of which independently control a unique subset or plurality of lamp control modules 20.

Individual control modules 20 may be selected or de-selected once the track repeater module 50 is made operative in the programming mode through use of the laser 18. As in the above stated programming of scenes, once the track repeater module 50 is selected, the track repeater module LED will flash indicating it is currently in the programming mode as well as all of the repeater modules 20 LEDS 23 which are associated with the repeater module 50 by the preprogrammed address. Thus, a "fade" effect may be programmed for the entire plurality of control modules 20 through the use of the repeater module 50 such that a desired fade time defining the amount of time to transition from one scene to another programmed in the individual control modules 20 will be set. Variations in time such as 7 seconds, 15 seconds, 4 minutes or a user defined variable may be entered and programmed. The effect may be programmed into any of the pre-programmed scenes, which are defined for the plurality of control modules.

Likewise, the "cycle" effect noted above may be similarly programmed into control modules 20 through the use of the track repeater module 50. The cycle effect may allow the user to select transitions from one scene to another through a selected sequence of programmed scenes such that the system of the present invention 10 will repeat the same scene sequence while activated. A cycle can be a single run of the programmed scenes or a looping cycle, which may be the sequence of programmed scenes running repeatedly. Such an effect allows the user to define particularized light sequences for display purposes, for time periods or for entertainment or show purposes.

In operation for programming of the cycle effect noted above, the remote control unit 15 laser 18 may select the track repeater module 50 and the cycle button on the remote control may be selected. The track repeater module 50 will then indicate it is currently in the programming mode similarly to the fade effect noted above and the LED 53 will begin blinking allowing the operator to program the sequence of scenes desired. Thus, upon transmission of the code representative of the desired scene, such as scene A, all track control modules 20 electrically or communicatively connected to the track repeater module 50 will transition to scene A which may be pre-programmed in each of the track control modules 20. In succession, the next scene desired in the sequence may be selected by depressing the appropriate button on the remote control unit 15 and transmitting, through the IR transmitter 17, the appropriate command to the track repeater module 50. The track repeater module 50 will then transmit through the power line 14 the appropriate code or signal to all of the track control modules 20, which are communicatively or electrically connected by address to the track repeater module 50.

Once the entire sequence has been programmed, the appropriate learn command or program command may be transmitted by the remote control unit 15 such that the entire sequence will be recorded in the repeater module memory. All of the track control modules will then begin to cycle through the programmed scenes, switching from one to the next based upon the appropriate "fade" effect which may also be programmed in conjunction with the cycle effect. A default time period may be pre-programmed into the system of the present invention such that the system cycles for a pre-defined period of time through each of the programmed scenes, sometimes referred to as a time delay feature.

Figure 6:
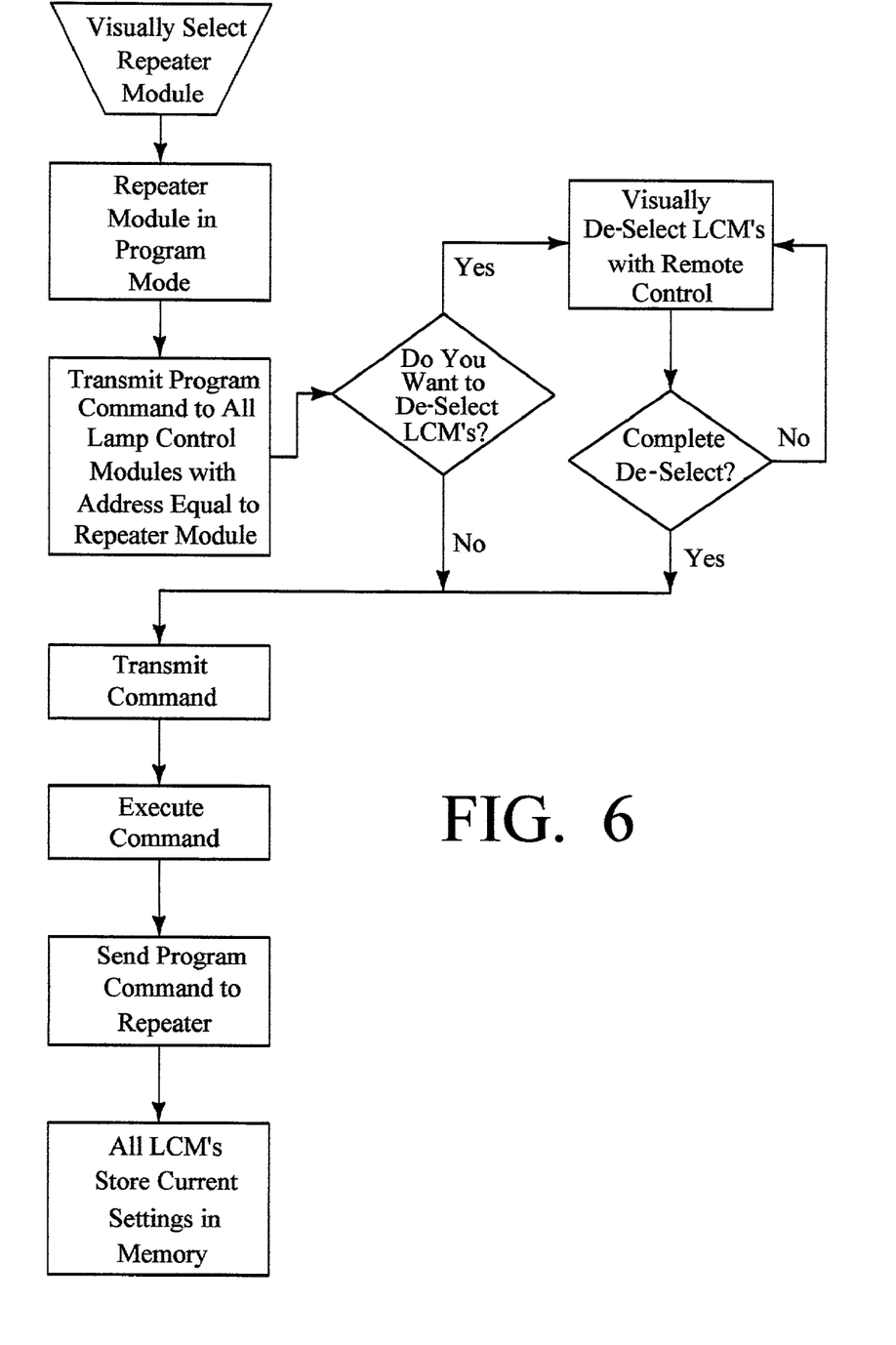
FIG. 6 is a flow chart of steps used for using the repeater module to program the control modules in the system of FIG. 1.

For activation of the programmed effects, the remote control unit may be directed toward the track repeater module and the appropriate function key may be depressed thereby transmitting the signal to the track repeater module 50 which would then be retransmitted to all of the track control modules execution of the appropriate function or effect. Obviously, a significant number of effects or functions may be implemented using the system of the present invention allowing for the track repeater module to program a plurality of track control modules while also allowing individual track control modules to be selected or deselected through the use of the laser on the remote control unit for inclusion into the programmed effect. This is also schematically shown in the flow diagram of FIG. 6.

Figure 5:
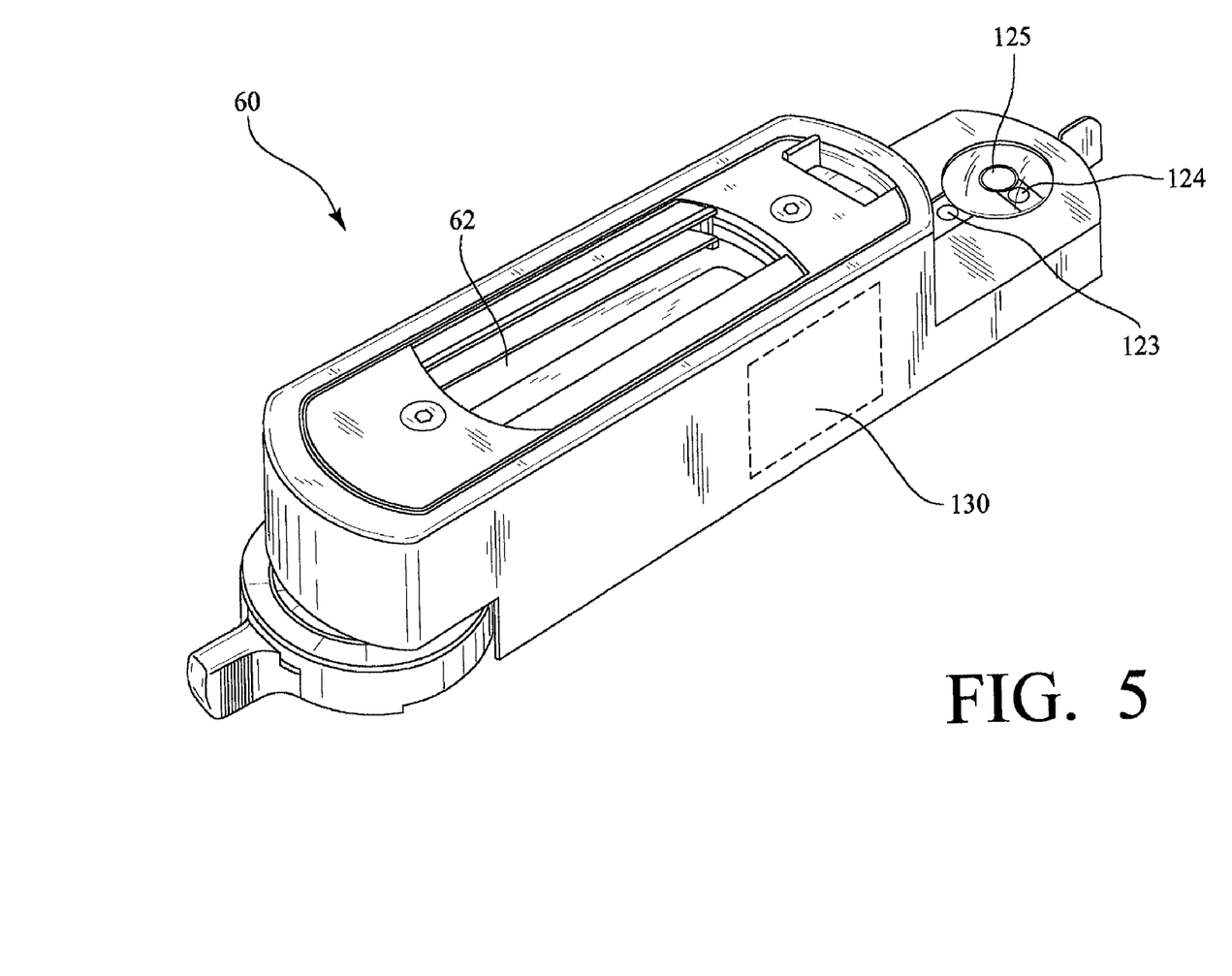
FIG. 5 is an alternative light fixture module for use in the system shown in FIG. 1.

As depicted in the figures, the track control module may be an integrated unit wherein the lamp 22, electrical connections or track runners 21, the control circuitry 37 and other electronics are necessary for programming, selection, and receipt of the transmissions from the remote control unit are integrally provided. The lamp control module 20 depicted therein may be a dimmable unit or may be one such that no dimming function may be provided. Alternatively, as depicted in FIG. 5, a track fixture caddy 60 may be provided wherein a caddy track 62 is placed on an exterior surface allowing a standard light track fixture to be installed therein for providing power thereto and such that the function of the present invention may be implemented through the caddy 60. As such, caddy LED 123, IR receiver 124, laser receiver 125 and circuitry 130 may be provided as is similarly incorporated in the track control module 20 depicted in FIG. 2. Control circuitry 130, similar in functionality to control circuitry 30 previously described, may include a microprocessor 38, storage memory 32, and lamp control electronics 37, among other electronics, the lamp control electronics operable to control the power supplied to caddy track 62 in order to adjust the light output of the fixture inserted within the caddy track 62. By providing the track fixture caddy 60, retrofit of older fixtures may be enabled. Additionally, the design may be incorporated with use of a motorized fixture such that pointing or other angular positioning data may be provided and the microprocessor 38 may interpret and control actual movement of the fixture upon receipt of necessary movement and position commands.

The control circuitry 30 placed on the track control modules are similarly placed on the track fixture caddy module 60 may include non-volatile memory 32, power line controller logic 34, lamp control circuitry or electronics 37 as well as the electronics required for the infrared and laser receivers 36. Additionally, a microprocessor 38 is provided to integrate the entire electronic assembly and instructions for transmission and receipt of signals, control of a plurality of track control modules, incorporation of the power line controller logic 34 and other functions or electronic features. Implementation of power line control logic 34 may utilize standard or known power line controller filters and other transmission techniques known in the art for filtering of the power supply and transmission of communicative signals from the repeater module 50 to each of the control modules 20. As such, the control modules should have circuitry allowing or enabling the receipt of electronic communication through the power supply which may be implemented through the power line control logic 34 implemented in the control circuitry 30.

While the description herein is set forth in relation to utilization of the system with light track fixtures, it is understood that many other implementations may be available to one of ordinary skill in the art upon reading of this disclosure. Thus, integration into decorative fixtures, a luminaire or other light fixture falls within the scope of the teachings herein.

The foregoing detailed description is primarily given for clearness of understanding for the addressable system for light fixtures of the present invention and no unnecessary limitations are to be understood therefrom or from the particular examples and functions given herein. Modifications and other variations will become obvious to those skilled in the art upon reading of the disclosure contained herein including the figures and submitted claims, without parting from the spirit of the invention or the scope of the appended claims.

We claim:

1. An addressable system for track light fixtures, comprising:

at least one track control module, said track control module having a lamp, an infrared receiver, a visual light receiving sensor, a visual programming indicating interface, and control module electronics electrically connected to said lamp, said infrared receiver and visual light receiving sensor;

a remote control unit having an infrared transmitter and a visual light transmitter, said remote control unit operable to communicate with said at least one track control module;

a track repeater module in electrical communication with said at least one track control module and operable to communicate with said at least one track control module;

wherein said at least one track control module can be individually selected for programming by said remote control unit through said visual light transmitter and said visual light receiving sensor.

2. The addressable system for light fixtures of claim 1 wherein said at least one track control module is communicably connected to said remote control unit through said infrared transmitter using said infrared receiver on said track control module.

3. The addressable system for light fixtures of claim 1 further comprising a plurality of electrical light fixture tracks in electrical communication with each other and in operable communication relationship with said track repeater module.

4. The addressable system for light fixtures of claim 3 wherein said track control module electronics are electrically connected to said lamp, and further wherein said infrared receiver and said visual light receiving sensor further comprises storage memory capable of storing a plurality of lamp brightness settings for said lamp on said track control module.

5. The addressable system for light fixtures of claim 4 wherein said track repeater module further comprises a line signal transmitter for communicating signals received from said remote control through said electrical tracks.

6. The addressable system for light fixtures of claim 4 wherein said at least one track control module further has a microprocessor and instructions stored thereon for:
 allowing said at least one track control module to be selected for programming by said remote control through said visual light receiving sensor;
 programming said at least one track control module using said remote control to store said plurality of lamp brightness settings in said storage memory;
 associating said plurality of lamp brightness levels in said memory with unique memory identifiers.

7. The addressable system for light fixtures of claim 6 wherein said track repeater module has electronics and instructions stored thereon, said instructions including:
 identifying a programming signal from said remote control;
 programming a functional effect for at least one track control module using said track repeater module;
 storing commands from said remote control representative of said functional effect on said track repeater module;
 transmitting said commands for said functional effect to said at least one track control module through an electrical connection between said track repeater module and said at least one track control module.

8. The addressable system for light fixtures of claim 4 wherein said at least one track control module is a plurality of track control modules in electrical communication with said track repeater module, said track repeater module and said plurality of track control modules having electronics and instructions located thereon for:
 placing each of said plurality of track control modules in programming mode;
 setting simultaneously a lamp brightness level for each lamp on each of said plurality of track control modules through said track repeater module;
 programming said lamp brightness level in said storage memory of each of said plurality of track control modules.

9. The addressable system for light fixtures of claim 8 wherein said setting simultaneously a brightness level for each lamp on each of said plurality of track control modules includes transmitting commands to each of said plurality of track control modules through said electrical communication indicative of said lamp brightness level.

10. An addressable system for light fixtures, comprising:
 a plurality of control modules, each of said control modules in electrical communication with a lamp and having a visual light receiving sensor, a command receiving sensor, a visual programming indicating interface and storage memory;
 a remote control having a visual light transmitter operable with said visual light receiving sensor of said plurality of control modules and a command transmitter operable with said command receiving sensor of said plurality of control modules;
 said system further having a repeater module in electrical communication with said plurality of control modules, said repeater module having a visual light receiving sensor, a command receiving sensor and visual programming indicator;
 wherein each of said plurality of control modules can be visually selected by said remote control allowing said storage memory in each of said plurality of control modules to store lamp control data.

11. The system of claim 10 wherein said plurality of control modules can be programmed for said storage of lamp control data individually and as a user selected group by said visual light transmitter of said remote control.

12. The system of claim 11 wherein said plurality of control modules, remote control and said repeater module further comprise electronics and instructions for:
 labeling each of said plurality of control modules with a predefined address definition;
 communicating simultaneously through said electrical communication lamp control data commands to said plurality of control modules having said predefined address definition through said repeater module;
 setting said lamp using said remote control for all of said plurality of control modules by addressing said repeater module;
 storing said lamp control data in said storage memory of each of said plurality of control modules having said predefined address definition when commanded by said repeater module.

13. The system of claim 12 wherein each of said control modules in electrical communication with said repeater module having said predefined address definition can be visually selected and unselected for said setting of said lamp using said visual light transmitter on said remote control.

14. A system for addressing light fixtures, comprising:
 a plurality of control modules, each of said control modules having a lamp, memory, a microprocessor, a laser light sensor and an infrared sensor;
 a remote control having a laser light emitter and an infrared transmitter;
 wherein for each of said plurality of control modules, said microprocessor is connected to said memory and is operative to:
 receive addressing instructions from said remote control to address each of said control modules with a predefined address;
 activate programming of said memory by selection of said control module using said laser light emitter on said remote control;
 adjust said lamp to a desired lamp brightness setting;
 store lamp brightness data representative of said lamp brightness setting in said memory on command from said remote control;
 associate said lamp brightness data in said memory with a predefined identifier.

15. The system for addressing light fixtures of claim 14 further comprising a repeater module in electrical communication with said plurality of control modules, said repeater module having a laser light sensor and an infrared sensor, a microprocessor, memory storage, and a power line carrier command transmitter able to transmit electronic commands through said electrical communication to said plurality of said control modules.

16. The system for addressing light fixtures of claim 15 wherein said microprocessor and memory storage on each of said repeater modules is operative to:
   receive said laser light from said remote control;
   transmit said electronic commands in response to being selected by said laser light on said remote control to each of said plurality of control modules;
   simultaneously adjust said lamp brightness settings on said lamps for each of said plurality of control modules in response to said commands to said repeater module;
   activate programming of said memory on each of said plurality of control modules in response to said commands to said repeater module from said remote control;
   store said lamp brightness data settings in said memory in response to said commands to said repeater module from said remote control in each of said plurality of control modules;
   associate said lamp brightness data in said memory of each of said plurality of control modules having said predefined address.

17. A light fixture addressing system, comprising:
   a remote control having a visible laser transmitter and a command transmitter;
   a plurality of lamp control modules, each of said modules having a light sensor, a command input sensor, a microprocessor operably connected to said light sensor and said command input sensor, storage memory and a lamp, each of said plurality of lamp control modules in electrical connection to a power supply source, each of said lamp control modules having instructions for said microprocessor operable to:
   remotely program each of said lamp control modules with a user modifiable address;
   allow each of said lamp control modules to be selected into a programming mode by said remote control by passing said laser transmitter over said light sensor;
   adjust the brightness of said lamp by sending commands through said command transmitter of said remote control to said command input sensor;
   store a lamp brightness value representative of said lamp brightness of said lamp for each of said lamp control modules into one of a plurality of storage memory locations in said lamp control module.

18. The light fixture addressing system of claim 17 wherein said microprocessor on each of said plurality of lamp control modules is further operable to:
   recall each of said plurality of lamp brightness values from said storage memory locations by receiving a command from said remote control unit, said command including a storage memory location identifier.

19. The light fixture addressing system of claim 18 wherein each of said lamp control modules has a plurality of storage memory location identifiers for storing lamp brightness values in said plurality of storage memory.

20. The light fixture addressing system of claim 17 further comprising a repeater module in electrical power line carrier communication with said plurality of lamp control modules, said repeater module having a light sensor, a command input sensor, a microprocessor and memory, said repeater module having instructions in said memory executing on said microprocessor operative to:
   allow said repeater module to be selected for programming by said light sensor being in visual communication with said light source of said remote control;
   activate said plurality of lamp control modules into said programming mode through said electrical communication;
   modify brightness of said lamps on said plurality of lamp control modules through said electrical communication;
   store said lamp brightness value of said lamps for each of said lamp control module into one of a plurality of storage memory in each individual lamp control module.

21. The light fixture addressing system of claim 20 wherein said repeater module and each of said lamp control modules has an address identifier stored in said storage memory, said repeater module electrically communicable with said lamp control modules having the same address identifier.

22. The light fixture addressing system of claim 21 wherein said address identifier stored in said repeater module and said plurality of lamp control modules can be modified.

* * * * *